United States Patent Office 3,175,946
Patented Mar. 30, 1965

3,175,946
STEROID FOR DYSPROTEINEMIA
Jean de Larebeyrette, 27 Rue Saint-Georges,
Paris, France
No Drawing. Filed June 21, 1963, Ser. No. 289,745
Claims priority, application France, June 22, 1962,
901,720
2 Claims. (Cl. 167—77)

The invention has for its object a corrective medication for metabolic disorders, and more especially those disorders which are referred-to as alpha dysproteinemia (that is to say which result in an abnormal increase in the serum euglobulin content) as represented by ailments such as hemogliasis, the evolutional outbreaks of degenerative rheumatism, certain collagenosis (gonarthrosis of the menopause).

The medicament in accordance with the invention is essentially characterized in that it contains alpha-ketoglutarate of 11-deoxy-17-hydroxycorticosterone.

This ester can be prepared by the direct action of alpha-ketoglutaric acid on 11-deoxy-17-hydroxycorticosterone by means of a method which is similar to that which is employed for the preparation of the citrate or isocitrate of this same cortisone, said method having been disclosed in the co-pending patent application Serial No. 289,744, filed by the present applicant on the same day as the present application.

The alphaketoglutarate in accordance with the invention can be prepared in the following manner:

One liter of anhydrous ethyl oxide is placed in a balloon-flask having two delivery tubes and fitted with a mechanical stirrer and is brought to —10° C.; the liquid is saturated with dry gaseous hydrochloric acid; there are then added 500 mg. of 11-deoxy-17-hydroxycorticosterone and the equimolecular quantity of alphaketoglutaric acid namely 277 mg.

Dry hydrochloric gas is continuously passed through the mixture while maintaining the temperature at —10° C. until the 11-deoxy-17-hydroxycorticosterone has completely dissolved; the esterification reaction lasts approximately 4 to 5 hours.

The ethyl oxide is then vacuum evaporated until completely dry; the residue which is obtained is triturated with a further quantity of ethyl oxide and this solvent is again evaporated; these operations are repeated a number of times in order to eliminate the excess acid.

The final residue is vacuum dried on phosphoric anhydride and potash; the dry product which is thus obtained is dissolved in acetone precipitated by the addition of water and filtered; this operation is carried out once again.

The process of esterification at —10° C. as heretofore described avoids the need for secondary reactions (in particular of reinification of 11-deoxy-17-hydroxycorticosterone), thereby making it possible to obtain a pure product with a substantial yield.

The process is carried out in the cold state, preferably in the vicinity of —10° C., in order to prevent secondary reactions such as the resinification of 11-deoxy-17-hydroxycortisone.

The process described with respect to the preparation of the citric or isocitric ester can be applied without any modification whatever to the alphaketoglutaric ester. There is accordingly obtained a product having a melting point of 166° C.–168° C.; this product exhibits a carmine hue in the presence of concentrated sulphuric acid.

Elementary analysis of said product gives the empirical formula $C_{26}H_{34}O_8$; the proportions by weight of the carbon, hydrogen and oxygen are provided by the following table:

|   | Theoretical, percent | Experimental, percent |
|---|---|---|
| C | 65.82 | 64.95 |
| H | 7.17 | 6.88 |
| O | 27.00 | 27.26 |

This product corresponds to the developed formula:

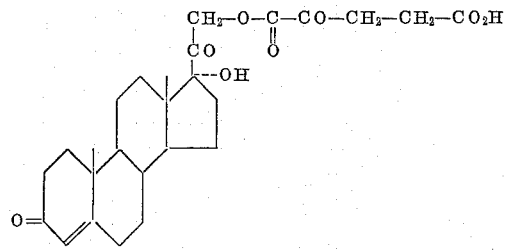

The medicament in accordance with the present invention can be administered to the patient in different forms, but preferentially by the mouth, the conditioning being effected in the form of compressed tablets; independently of the usual excipients, this medicament can comprise adjuvants of a very varied nature such as magnesium citrate, etc.

In order to provide a clearer understanding of the invention and for the purpose of explanatory illustration, there now follow below a few examples of therapeutic applications. It will be understood that these examples are not given by way of limitation.

Example I

The patient is a man of 54 years of age; he is afflicted with hemogliasis and suffers from headaches at the nape of the neck, dizziness, post-prandial somnolence, ischialgia, obesity (weight: 84 kgs.—height: 1 m. 62).

Prior to treatment, his biological condition can be represented by the following blood tests:

Viscosity _____ 5.8
Alpha-2 euglobulins _____ 84
Beta euglobulins _____ 74
Beta lipoproteins _____percent__ 76
Alpha lipoproteins _____do____ 11
Gamma lipoproteins _____do____ 13
Cholesterolytic power _____do____ —9
Uricaemia _____g__ 0.094

This patient accordingly absorbs twice daily 3 compressed tablets of a medicament in accordance with the invention, each tablet containing 2 mg. of alphaketoglutarate of 11-deoxy-17-hydroxycorticosterone and 0.50 mg. of magnesium citrate.

Three months later, the following results are obtained:

Viscosity _____ 5.1
Alpha-2 euglobulins _____ 59
Beta euglobulins _____ 66
Beta lipoproteins _____percent__ 59
Alpha lipoproteins _____do____ 22
Gamma lipoproteins _____do____ 9
Cholesterolytic power _____do____ +2
Uricaemia _____g__ 0.045

Ischialgia has disappeared; the headaches are less intense and of shorter duration; dizziness has disappeared; post-prandial somnolence has receded on about the tenth day of treatment so as to disappear completely one month later; the body weight has decreased by four kilograms; the few stomach pains previously noted have not varied.

Example II

The person undergoing treatment is a woman afflicted with bilateral gonarthrosis, who has reached the menopause four years ago and who complains of a monthly access of pain which lasts approximately two weeks and is located at the level of the knees, but also at the level of the radial styloids.

This woman also suffers from cervical arthrosis C6–C7, obesity (weight: 91 kgs.—height: 1 m. 64), from psychode pression, from apathy, and is subject to post-prandial somnolence.

The patient does not tolerate treatment with beriamide, colchiceine, aspirin, atophan.

The biological condition of this patient can be represented by the following blood tests:

| | |
|---|---:|
| Viscosity | 5 |
| Alpha-2 euglobulins | 71 |
| Beta euglobulins | 58 |
| Beta lipoproteins _____percent__ | 84 |
| Percentage of prothrombin _____do____ | 120 |
| Cholesterolytic power _____do____ | +4 |
| Uricaemia _____g__ | 0.071 |

Four compressed tablets of a medicament in accordance with the invention are administered daily at each of the three meals for a period of twenty days, each tablet containing 2 mg. of alpha-ketoglutarate of 11-deoxy-17-hydroxycorticosterone.

This treatment is then maintained only for two-week periods which correspond each month to a recurrence of pain.

These recurrences of pain are respectively stopped in 5 days, 3 days and 2 days at the first, second and third stages of treatment.

The body weight is reduced by 3 kgs. in three months of treatment without any diet being followed; periods of somnolence disappear after the second day; general apathy and depressive ideas are replaced by a remarkable euphoria, the psychodepressive disorders having ceased on about the fourth day of treatment.

After five months of treatments, the following results were achieved:

| | |
|---|---:|
| Viscosity | 4.8 |
| Alpha-2 euglobulins | 49 |
| Beta euglobulins | 45 |
| Beta lipoproteins _____percent__ | 71 |
| Cholesterolytic power _____do____ | +6 |
| Percentage of prothrombin _____do____ | 100 |
| Uricaemia _____g__ | 4.8 |

Meanwhile, biological examinations had shown that a discreet increase in the alpha-2 euglobulin content had taken place each time the treatment was interrupted. In conclusion, it can be stated that the clinical symptoms are in this case very responsive to the treatment.

What I claim is:

1. A pharmaceutical composition comprising a compound of the formula

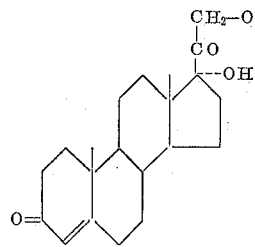

in an amount ranging from 0.5 to 5 mg., 0.5 mg. of magnesium citrate and a pharmaceutical carrier.

2. A pharmaceutical composition comprising a compound of the formula

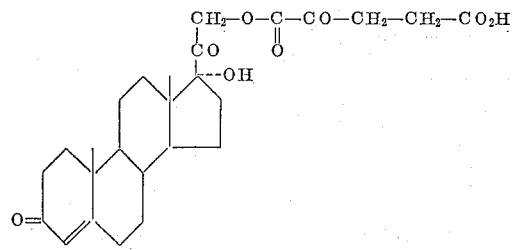

in an amount ranging from 0.5 to 5 mg. and a pharmaceutical carrier.

References Cited by the Examiner

UNITED STATES PATENTS

| | | | |
|---|---|---|---|
| 2,183,589 | 12/39 | Reichstein | 260—397.47 |
| 2,793,159 | 5/57 | Johnson | 167—77 |
| 2,801,202 | 7/57 | Poetsch | 167—77 |
| 2,860,149 | 11/58 | Loken | 260—397.47 |
| 2,862,939 | 12/58 | Dodson | 260—397.47 |
| 3,025,311 | 3/62 | Gutsell | 167—77 |
| 3,033,748 | 5/62 | Wettstein | 167—77 |
| 3,073,743 | 1/63 | Spero | 167—77 |

OTHER REFERENCES

McGinty, Science, vol. 112, p. 506, October 1950.

JULIAN S. LEVITT, *Primary Examiner.*

FRANK CACCIAPAGLIA, Jr., LEWIS GOTTS,
*Examiners.*